US012580508B2

(12) United States Patent
Hauer et al.

(10) Patent No.: US 12,580,508 B2
(45) Date of Patent: Mar. 17, 2026

(54) MOTOR CONTROL CIRCUIT

(71) Applicant: Infineon Technologies AG, Neubiberg (DE)

(72) Inventors: Florian Hauer, Munich (DE); Marko Gecic, Neubiberg (DE); Kajetan Nürnberger, Munich (DE); Jürgen Schafer, Oberhaching (DE)

(73) Assignee: Infineon Technologies AG, Neubiberg (DE)

( * ) Notice: Subject to any disclaimer, the term of this patent is extended or adjusted under 35 U.S.C. 154(b) by 167 days.

(21) Appl. No.: 18/391,734

(22) Filed: Dec. 21, 2023

(65) Prior Publication Data

US 2024/0213897 A1     Jun. 27, 2024

(30) Foreign Application Priority Data

Dec. 21, 2022    (DE) ..................... 10 2022 134 257.3

(51) Int. Cl.
H02P 21/00        (2016.01)
G06N 3/04          (2023.01)
H02P 21/18        (2016.01)
H02P 21/22        (2016.01)

(52) U.S. Cl.
CPC ........... H02P 21/0014 (2013.01); G06N 3/04 (2013.01); H02P 21/18 (2016.02); H02P 21/22 (2016.02)

(58) Field of Classification Search
CPC ...... H02P 21/18; H02P 21/0014; H02P 21/22; G06N 3/04
USPC .................................................. 318/400.02
See application file for complete search history.

(56) References Cited

U.S. PATENT DOCUMENTS

| | | | | |
|---|---|---|---|---|
| 11,588,426 | B2 * | 2/2023 | Roemmelmayer ..... | H02P 21/18 |
| 2017/0104430 | A1 * | 4/2017 | Magee ................... | H02P 21/24 |
| 2020/0266743 | A1 | 8/2020 | Li et al. | |
| 2021/0226567 | A1 * | 7/2021 | Roemmelmayer ........................ H02P 21/0014 | |
| 2021/0359577 | A1 * | 11/2021 | Funk ......................... | G06N 3/08 |
| 2023/0361707 | A1 * | 11/2023 | Hao ......................... | B60L 15/20 |
| 2024/0022194 | A1 * | 1/2024 | Szymula ................. | H02P 23/14 |
| 2024/0136969 | A1 * | 4/2024 | Thyagarajan ........... | H02P 29/64 |

FOREIGN PATENT DOCUMENTS

DE        102021100418 A1      7/2021

OTHER PUBLICATIONS

Rajesh Kumar et al., "An Artificial Neural Network Based Rotor Position Estimation for Sensorless Permanent Magnet Brushless DC Motor Drive" Published Nov. 10, 2006.

* cited by examiner

*Primary Examiner* — Gabriel Agared
(74) *Attorney, Agent, or Firm* — Eschweiler & Potashnik, LLC

(57)        ABSTRACT

According to various embodiments, a motor control circuit is described having a controller configured to determine values of a plurality of control voltages for a motor. The motor control circuit includes one or more current sensors configured to measure a plurality of operation currents of the motor and a neural network having a multi-layer perceptron architecture. The neural network is trained to estimate a rotor position of the motor for a current control cycle. The controller is configured to determine values of the plurality of control voltages for the current control cycle using the estimate of the rotor position.

20 Claims, 5 Drawing Sheets

500

501

Measure operation currents

502

Estimate rotor position by MLP

503

Determine control voltages using estimate

MOTOR CONTROL CIRCUIT

REFERENCE TO RELATED APPLICATIONS

This application claims priority to German Patent Application 10 2022 134 257.3, filed on Dec. 21, 2022, the contents of which are hereby incorporated by reference in their entirety.

FIELD

The present disclosure relates to motor control circuits.

BACKGROUND

Precise motor control is important to ensure energy-efficient performance of electric vehicles. One widely-used control concept for such electric motor control is field-oriented control (FOC) which controls the magnetic field of the motor based on the rotor's position. A physical sensor, e.g. an encoder or a resolver, measures the rotor position of the motor. This position in addition to information about the currents of the respective moment in time is passed to a control logic of the FOC. The control logic gives the control voltage values for the motor. The precision of the position measurement directly affects the control quality and, thus, the energy-efficiency of the motor. To increase precision, an option is to build the most precise position sensors into the car. However, this comes with several drawbacks, e.g. high build-of-material costs. Accordingly, approaches to improve position determination for motor control are desirable.

SUMMARY

According to various embodiments, a motor control circuit is provided comprising a controller configured to determine values of a plurality of control voltages for a motor, one or more current sensors configured to measure a plurality of operation currents of the motor, and a neural network having a multi-layer perceptron architecture, wherein the neural network is trained to estimate a rotor position of the motor for a current control cycle from an input.

The input includes, for each control cycle of one or more previous control cycles,
a. values of the plurality of control voltages supplied to the motor in the control cycle; and
b. values of the plurality of operation current measured by the one or more current sensors in the control cycle; and
for the current control cycle, values of the plurality of operation current values measured by the one or more current sensors in the current control cycle.

The controller is configured to determine values of the plurality of control voltages for the current control cycle using the estimate of the rotor position.

BRIEF DESCRIPTION OF THE DRAWINGS

In the drawings, similar reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
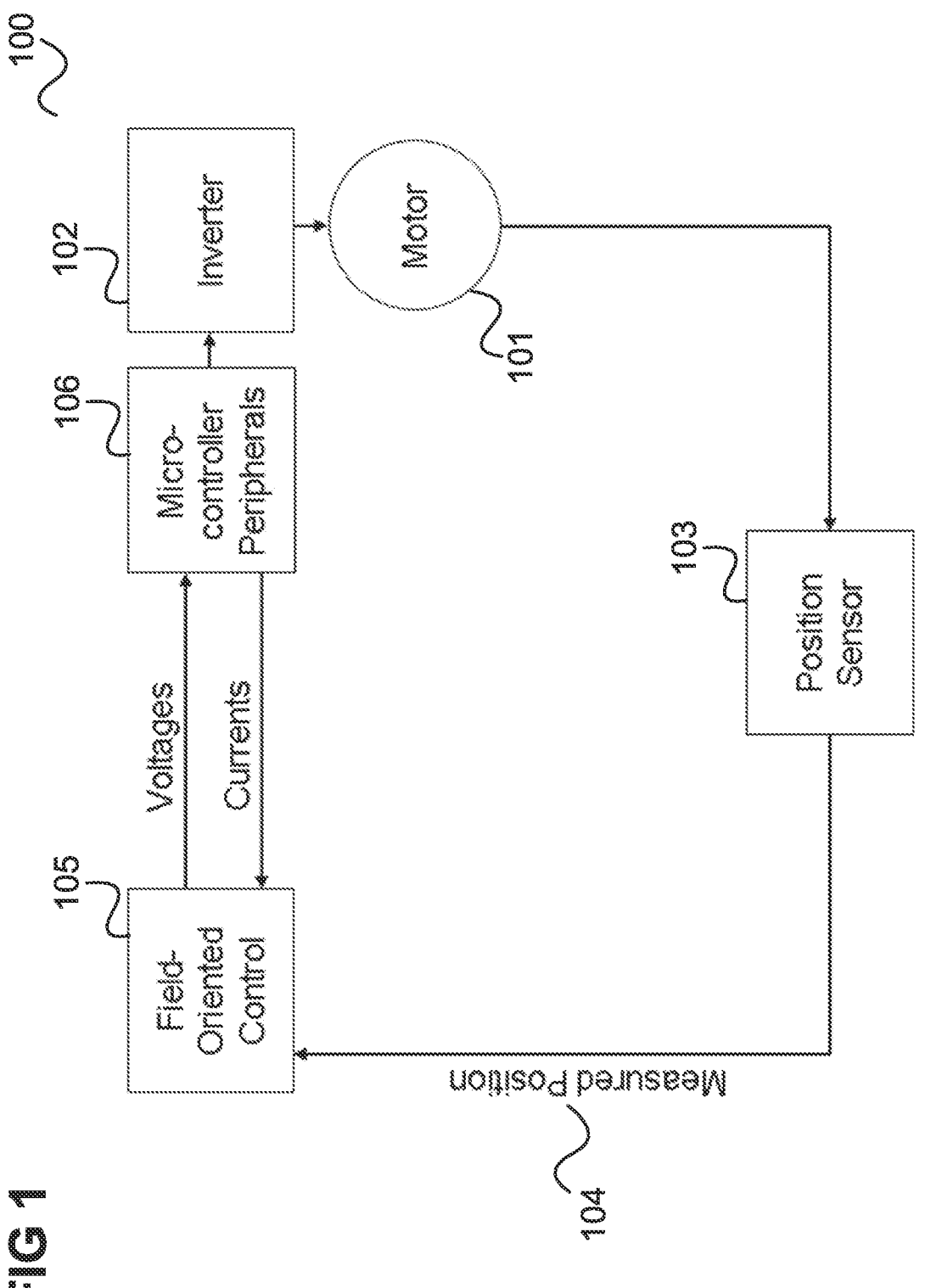
FIG. 1 shows a motor control arrangement.

FIG. 1 shows a motor control arrangement 100.

The motor control arrangement 100 comprises a motor 101 which is supplied with voltages (typically for three phases) by an inverter 102. A (physical) position sensor 103 (e.g. an encoder/resolver) measures the rotor position of the motor 101 and supplies the measured (rotor) position 104 to a controller 105 (also referred to as FOC (field-oriented control)). The controller 105 further receives information of motor currents (e.g. about the current flowing in the three phases) measured by microcontroller peripherals 106 (comprising one or more corresponding current sensors) and calculates information about the voltages to be supplied to the motor 101 and supplies this information to the microcontroller peripherals which control the inverter 102 accordingly.

So, the controller 105 receives the information about the currents as well as the measured position 104 and computes voltages and sends them over the microcontroller peripherals 106 and the inverter 102 to the motor 101.

In a motor control arrangement like in FIG. 1 better position sensing by the position sensor 103 leads to higher energy-efficiency of the motor 101. One approach to improve accuracy is a position observer functionality based on linear mathematical structures, e.g. using an extended Kalman filter, but these are limited in quality. On the other hand, precise (physical) sensors are expensive so it is desirable to improve position sensing without using more expensive sensors.

Figure 2:
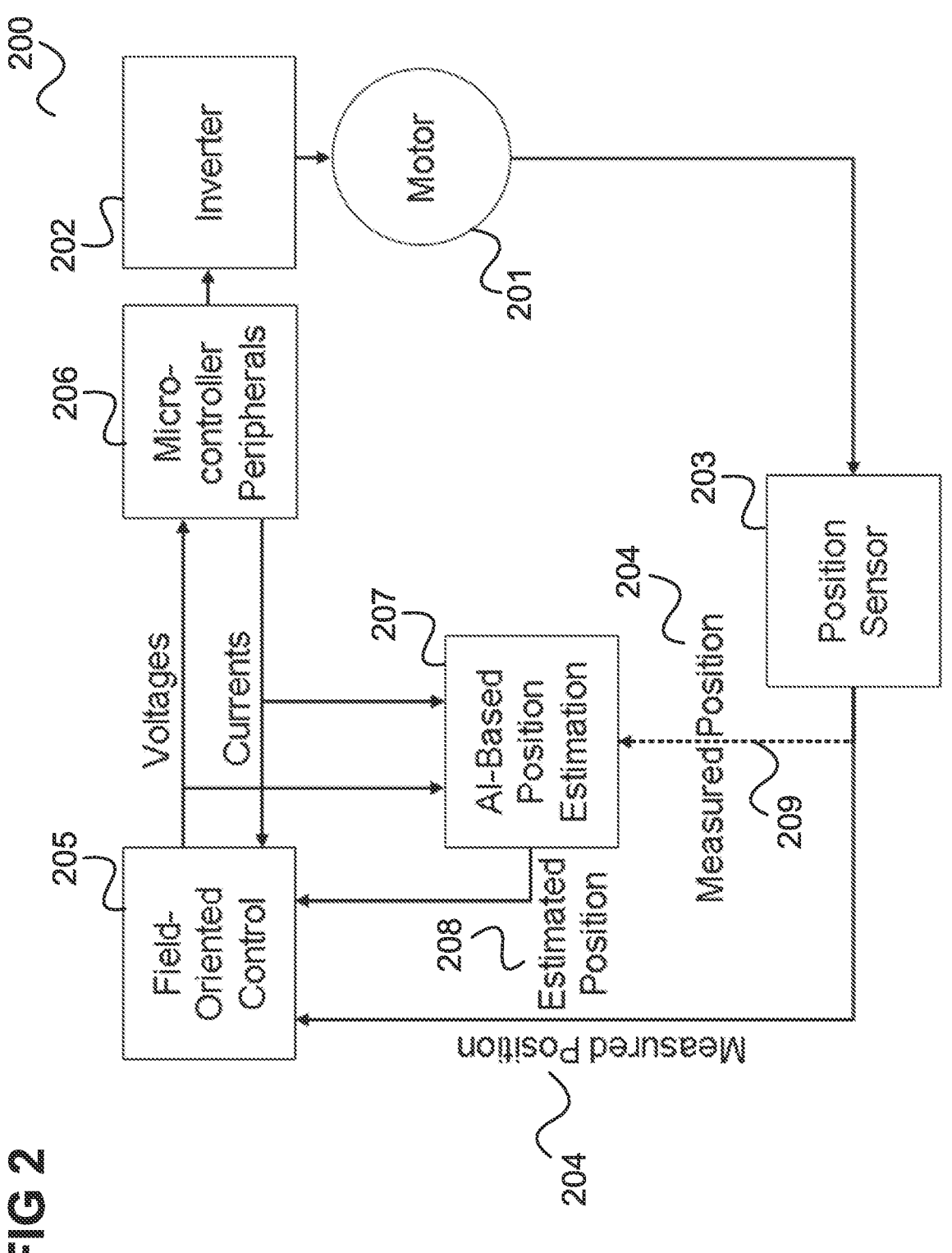
FIG. 2 shows a motor control arrangement.

FIG. 2 shows a motor control arrangement 200.

Similar to the motor control arrangement 100 of FIG. 1, the motor control arrangement 200 comprises a motor 201, an inverter 202, a position sensor 203 providing a measured position 204, a controller (or FOC) 205 and microcontroller peripherals 206.

In addition to the motor control arrangement 100 of FIG. 1, the motor control arrangement 200 comprises an AI (artificial intelligence)-based virtual position sensor 207 which receives as inputs the information about the voltages determined by the controller 205 and the motor currents an outputs an (AI-)estimated position.

Training data for the AI-based virtual position sensor 207 (which is for example implemented by a neural network) may be collected in a laboratory setup with highly accurate position data (measured using a more accurate position sensor than the one used in the field, i.e. in the deployed device that includes the motor 201, for generating ground truth information) and information about the voltages and currents with the quality that is expected in the field. Using these data, the AI-based virtual position sensor 207 may be trained and then deployed. An AI-based virtual position sensor 207 trained in this manner may achieve higher accuracy than a position sensor 203 (with comparable cost).

The AI-based virtual position sensor 207 performs one inference per control cycle of the motor control arrangement 200 (e.g. one inference, which may be implemented to take 10 μs to 20 μs, every 50 μs). A control cycle may refer to the periodicity with which the control voltages are re-calculated, i.e. the controller 205 determines the control voltages for each control cycle (or, in other words, each time step of a sequence of time steps). Accordingly, the position sensor 203 may measure the rotor position once per control cycle.

It should be noted that the controller may receive both the measured position 204 and the estimated position 208 and for example use the estimated position 208 if the estimated position 208 differs too much for the measured position 204 (i.e. the difference is above a predetermined threshold).

Furthermore, it should be noted that according to one embodiment, the AI-based virtual position sensor 207 receives as further input (in addition to the information about voltages and currents) the measured position 204 (as indicated by the dashed arrow 209), i.e. it can be seen to correct the measured position 204. Like described above, training may be performed using training data generated using a position sensor 203 that is highly precise (which is not used in deployment to save costs) for generating ground truth information. The AI-based virtual position sensor 207 may also be trained to predict the difference between the field sensor and the high-accuracy laboratory sensor (by providing corresponding ground-truth in training). After training, when deployed, the AI-based virtual position sensor 207 can then improve the field sensor's measurement, since it has been trained how much correction needs to be applied to reach the laboratory sensor's measurement accuracy.

The approach of the inclusion of an AI-based virtual position sensor as described with FIG. 2 may also be used for providing safety redundancy. Namely, in a motor control arrangement like in FIG. 1, if high safety is required (e.g. in case of a vehicle motor), providing this safety by means of a second physical sensor may be expensive and or even mechanically not be feasible (and the limited quality of mathematical structure-based observers may negatively affect redundancy). So, according to various embodiments, redundant position sensing without using a second physical sensor is achieved by using an AI-based virtual position sensor as illustrated in FIG. 3.

Figure 3:
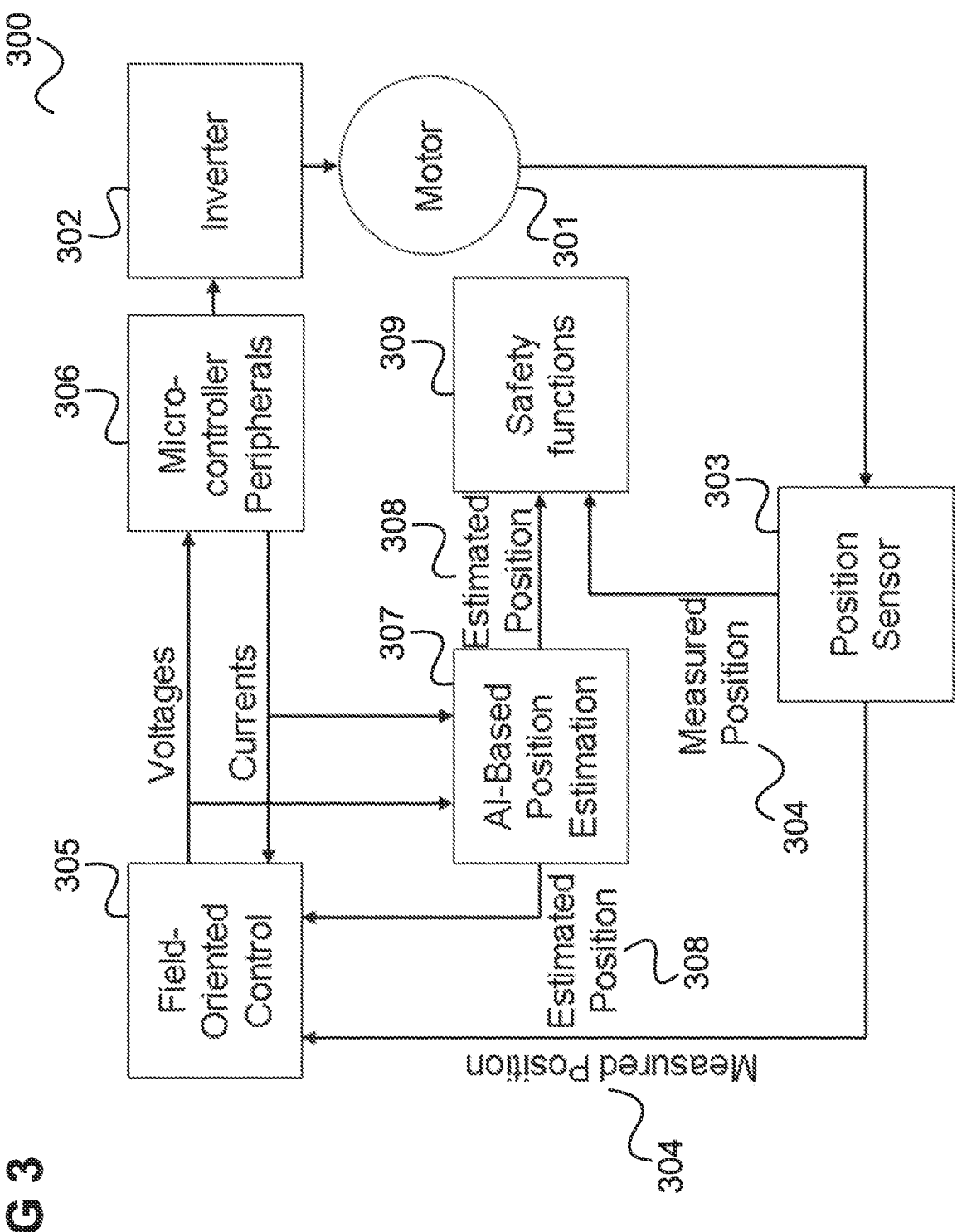
FIG. 3 shows a motor control arrangement.

FIG. 3 shows a motor control arrangement 300.

Similar to the motor control arrangement 200 of FIG. 2, the motor control arrangement 300 comprises a motor 301, an inverter 302, a position sensor 303 providing a measured position 304, a controller (or FOC) 305, microcontroller peripherals 306 and an AI-based virtual position sensor 307 providing a position estimate 308.

Further, the motor control arrangement 300 comprises one or more safety functions 309 (implemented by a respective safety function circuit) receiving both the measured position 304 and the position estimate 308. The AI-based virtual position sensor 307 may be trained as described with reference to FIG. 2. However, the training data may, in view of the redundancy aspect, be generated using a position sensor that has the quality of the position sensor used in the field (i.e. using field-quality training data). Accordingly, the AI-based virtual position sensor 307 may be trained offline (before deployment) or online (after deployment, i.e. in operation using the position sensor 303). When trained using field-quality training data, the AI-based virtual position sensor 307 is thus trained to emulate the physical sensor.

The safety functions 309 may for example compare the measured position 304 and the position estimate 308 and enter a safety mode if their difference is too high. For example, the safety functions 309 may instruct the controller 305 to use the measured position 304 as a basis for the control is the difference between measured position 304 and position estimate 308 is above a threshold (i.e. the measured position 304 may be used to validate the position estimate 308). The safety functions 309 may also limit how much the position estimate 308, if it is used as a basis for the control, may differ from the measured position 304.

To allow sufficiently fast inference for real-time position estimation (e.g. in 10 μs to 20 μs per 50 μs control cycle) and allow an embedded implementation of the respective motor control arrangement 200, 300 an efficient implementation (in particular with regard to memory and computational power requirements) of an AI-based virtual position sensor is provided according to various embodiments.

Figure 4:
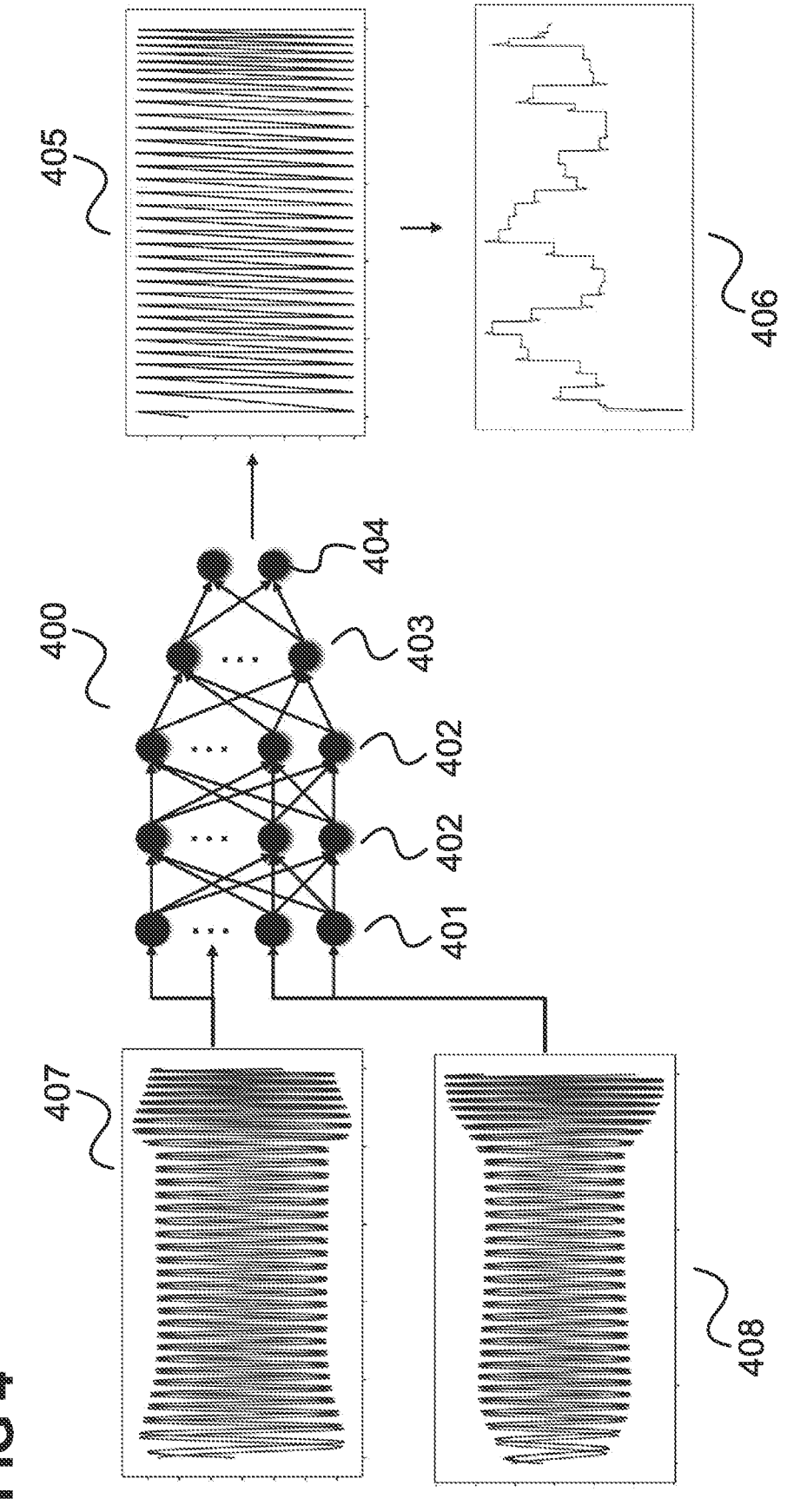
FIG. 4 shows a neural network for implementing an AI-based virtual position sensor.

FIG. 4 shows a neural network 400 for implementing an AI-based virtual position sensor.

The neural network 400 has a multi-layer perceptron (MLP) architecture comprising an input layer 401, one or more main layers (also referred to as first hidden layers herein) 402 (each having the same number of nodes (i.e. neurons) as the input layer 401), one or more transition layers 403 (also referred to as second hidden layers herein) having less nodes than the input layer 401 and having a decreasing number of nodes from transition layer to transition layer, e.g. exponentially decreasing such as half the number of nodes from transition layer to transition layer) and an output layer 404. The output layer 404 has for example two nodes wherein one node outputs the sine of a motor rotor angle and the other outputs the cosine of the motor rotor angle but other forms of output are possible. From the output provided by the output layer 404 (for a time step t), the motor position (of time step t) may be calculated and from the series of motor positions 405 over multiple time steps, the motor speed 406 over multiple time steps may be calculated.

The input layer receives voltage values 407 and current values 408 for a plurality of time steps (i.e. control cycles). Assuming three phases, the third voltage value may be calculated from two voltage values and the third current value may be calculated from two current values so, for each time step, a voltage value pair and a current value pair is for example input. It should be noted that if there are control voltages and operational currents for an higher number of lines, a higher number of control voltage values operational current values may be input for each time step.

It should be noted that for time step t which is currently considered (i.e. for which the position should be estimated), the voltage values that have been generated by the controller 205, 305 in the previous time steps (i.e. control cycles) are known but it is not yet known what voltage values are provided by the controller 205, 305 for the time step t (i.e. the current control cycle) itself (because the controller 205, 305 determines them from the estimate of the motor position of the time step t itself). In contrast, the current values for the time step t are known (since they are measured for the time step t).

Accordingly, according to various embodiments, while the same number of voltage value pairs as current value pairs may be input to the neural network for time step t, the current value pairs include the current value pair for the current time step while the voltage value pairs do not include the voltage value pair for the time step t but goes one step further in time.

So, for example, if t is the time step currently considered, the neural network receives $$(I_{1,t},I_{2,t}),(I_{1,t-1},I_{2,t-1}),\ldots,(I_{1,t-T+1},I_{2,t-T+1})$$

as current input and $$(U_{1,t-1},U_{2,t-1}),(U_{1,t-2},I_{2,t-2}),\ldots,(U_{1,t-T},U_{2,t-T})$$

as voltage inputs, i.e. the input for time t includes T pairs of current values from time $t-T+1$ to time t and T pairs of voltage values from time $t-T$ to time $t-1$. In other words, the input for both current and voltage includes the values included in a sliding window of T values, wherein the window for the voltages trails behind the window for the currents by one time step.

For example, $T=7$, so the dimensions of the neural network 400 are for example Input Layer: 28 nodes (four values times seven time steps)

Four main layers including each 28 nodes (including each an activation function, e.g. ReLu)

One transition layer including eight nodes (including each an activation function, e.g. ReLu)

Output Layer: two nodes (sine and cosine of position angle)

In summary, according to various embodiments, a motor control circuit is provided (further below to referred to as example 1) comprising a controller configured to determine values of a plurality of control voltages for a motor (e.g. corresponding to controller 205), one or more current sensors configured to measure a plurality of operation currents of the motor (e.g. corresponding to the microcontroller peripherals 206 and a neural network (e.g. corresponding to the AI-based virtual position sensor 207) having a multi-layer perceptron architecture.

The neural network is configured (in particular trained) to estimate a rotor position of the motor for a current control cycle from an input including for each control cycle of one or more previous control cycles, a. values of the plurality of control voltages supplied to the motor in the control cycle; and b. values of the plurality of operation current measured by the one or more current sensors in the control cycle; and for the current control cycle, values of the plurality of operation current values measured by the one or more current sensors in the current control cycle.

The controller is configured to determine values of the plurality of control voltages for the current control cycle using the estimate of the rotor position (i.e. using the output of the neural network in response to the input).

According to various embodiments, in other words a neural network having an architecture and an input allowing real-time operation is used for providing position estimates of a motor. It should be noted that other architectures that use past values (i.e. operation current values and control voltages of previous control cycles in the present use case) such as a LSTM (long short term memory) architecture are typically to slow for real-time operation.

The neural network may for example use ReLU as activation function which is of low computational complexity and thus may contribute to the estimation being suitable for real-time operation.

Figure 5:
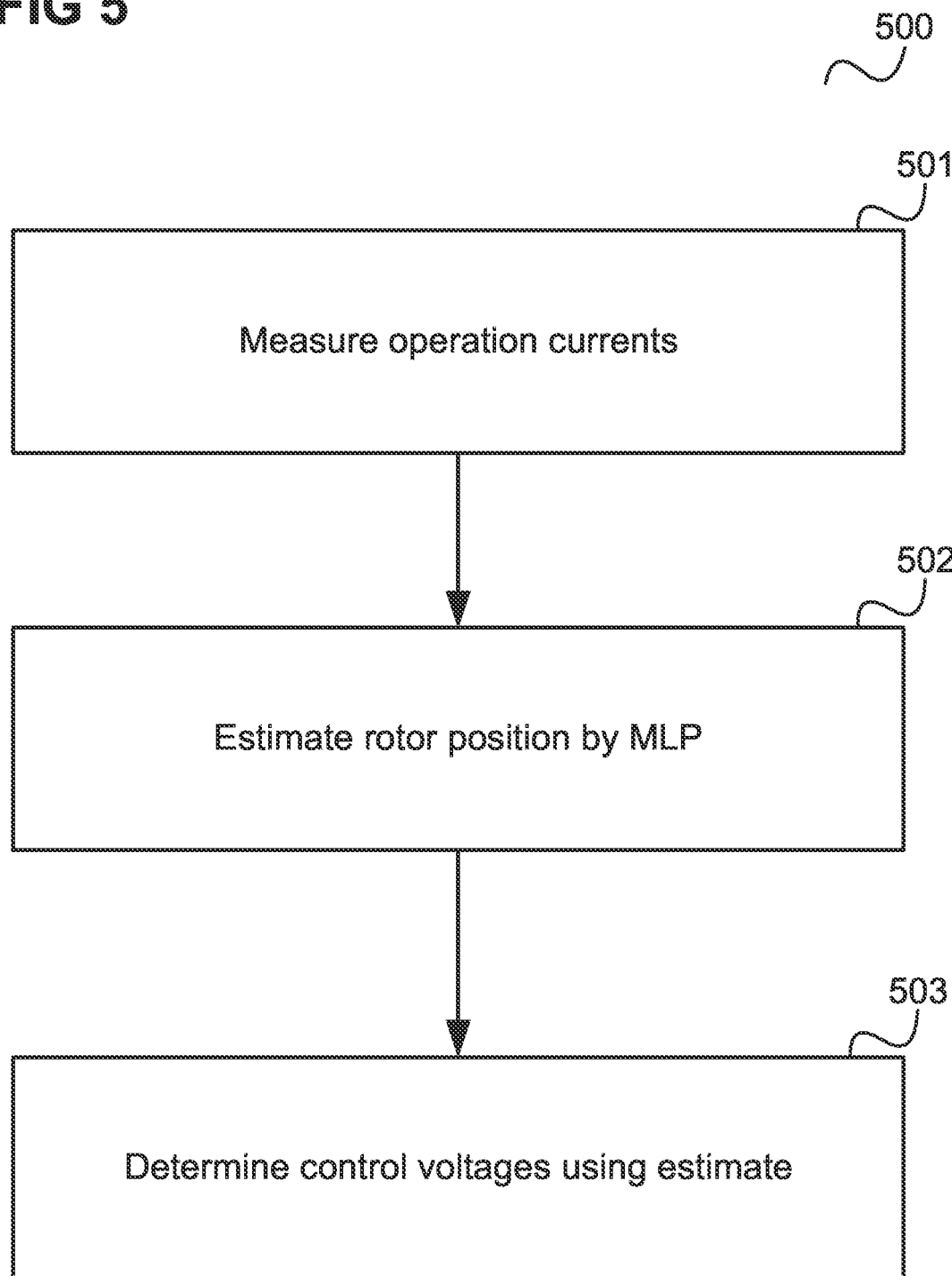
FIG. 5 shows a flow diagram illustrating a method for controlling a motor according to an embodiment.

According to various embodiments, a method for controlling a motor is provided as illustrated in FIG. 5.

FIG. 5 shows a flow diagram 500 illustrating a method for controlling a motor according to an embodiment.

In 501, a plurality of operation currents (stator and/or rotor currents) of the motor are measured (over multiple control cycles and e.g. for multiple phases of the motor).

In 502, a rotor position of the motor is measured for a current control cycle by means of a neural network having a multi-layer perceptron architecture, wherein the neural network is trained to estimate the rotor position of the motor for a current control cycle from an input including for each control cycle of one or more previous control cycles, a. values of the plurality of control voltages supplied to the motor in the control cycle; and b. values of the plurality of operation current measured by the one or more current sensors in the control cycle; and for the current control cycle, values of the plurality of operation current values measured by the one or more current sensors in the current control cycle.

In 503, values of the plurality of control voltages for the current control cycle are determined using the estimate of the rotor position.

It should be noted that the neural network can be run in a parallel processing unit (PPU).

The estimate of a rotor position and the measured rotor position may each represent the rotor position as an angle, as sine and cosine signals, or any other representation of the position.

Various Examples are described in the following:

Example 2 is the motor control circuit of example 1 described above, wherein the current control cycle and the one or more previous control cycles form a sequence of consecutive control cycles of the motor control circuit.

Example 3 is the motor control circuit of example 1 or 2, wherein the input comprises values of the plurality of control voltages supplied to the motor in a control cycle preceding the one or more previous control cycles.

Example 4 is the motor control circuit of example 3, wherein the current control cycle, the one or more previous control cycles and the control cycle preceding the one or more previous control cycles form a sequence of consecutive control cycles of the motor control circuit.

Example 5 is the motor control circuit of any one of examples 1 to 4, wherein the motor is a three-phase motor, the plurality of control voltages comprise a control voltage for two phases of the motor and the plurality of operation currents comprises operation currents for the two phases of the motor.

Example 6 is the motor control circuit of any one of examples 1 to 5, wherein the neural network is a fully connected neural network.

Example 7 is the motor control circuit of any one of examples 1 to 6, wherein the neural network comprises an input layer and an output layer, one or more first hidden layers, each having the same number of nodes as the input layer, and one or more second hidden layers, each having less nodes than each main layer and more nodes than the output layer.

Example 8 is the motor control circuit of any one of examples 1 to 7, further comprising a position sensor configured to measure the rotor position.

Example 9 is the motor control circuit of example 8, wherein the input to the neural network further includes a measurement of the rotor position by the position sensor of the current control cycle.

Example 10 is the motor control circuit of example 9, wherein the neural network is trained to estimate the rotor position in terms of a difference to the measurement of the rotor position by the position sensor of the current control cycle.

Example 11 is the motor control circuit of any one of examples 8 to 10, wherein the controller is configured to determine values of the plurality of control voltages for the current control cycle using the estimate of the rotor position and the measurement of the rotor position by the position sensor of the current control cycle.

Example 12 is the motor control circuit of any one of examples 8 to 11, comprising a safety function circuit configured to receive the estimate of the rotor position and the measurement of the rotor position by the position sensor of the current control cycle and to execute safety measures depending on a difference between the estimate of the rotor position and the measurement of the rotor position by the position sensor of the current control cycle.

Example 13 is the method of FIG. 5.

Example 14 is the method of example 13, comprising training the neural network by, for each of a plurality of training inputs, each training input comprising for each control cycle of one or more respective previous control cycles,
   a. values of the plurality of control voltages for control cycle; and
   b. values of the plurality of operation currents for the control cycle; and
   for a respective current control cycle, values of the plurality of operation current values for the current control cycle;
   generating ground truth data provided by a position sensor having higher accuracy than the position sensor of the motor control circuit and training the neural network to estimate, for each input, a rotor position of the motor by supervised training using the generated ground truth data.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A motor control circuit comprising:
   a controller configured to determine values of a plurality of control voltages for a motor;
   one or more current sensors configured to measure a plurality of operation currents of the motor; and
   a neural network having a multi-layer perceptron architecture, wherein the neural network is trained to estimate a rotor position of the motor for a current control cycle from an input including,
   for each control cycle of one or more previous control cycles,
   values of the plurality of control voltages supplied to the motor in the control cycle; and
   values of the plurality of operation currents measured by the one or more current sensors in the control cycle; and
   for the current control cycle, values of the plurality of operation currents measured by the one or more current sensors in the current control cycle;

wherein the controller is configured to determine values of the plurality of control voltages for the current control cycle using the estimate of the rotor position.

2. The motor control circuit of claim 1, wherein the current control cycle and the one or more previous control cycles form a sequence of consecutive control cycles of the motor control circuit.

3. The motor control circuit of claim 1, wherein the input comprises values of the plurality of control voltages supplied to the motor in a control cycle preceding the one or more previous control cycles.

4. The motor control circuit of claim 3, wherein the current control cycle, the one or more previous control cycles and the control cycle preceding the one or more previous control cycles form a sequence of consecutive control cycles of the motor control circuit.

5. The motor control circuit of claim 1, wherein the motor is a three-phase motor, the plurality of control voltages comprise a control voltage for two phases of the motor and the plurality of operation currents comprises operation currents for the two phases of the motor.

6. The motor control circuit of claim 1, wherein the neural network is a fully connected neural network.

7. The motor control circuit of claim 1, wherein the neural network comprises an input layer and an output layer, one or more first hidden layers, each having a same number of nodes as the input layer, and one or more second hidden layers, each having less nodes than each first hidden layer and more nodes than the output layer.

8. The motor control circuit of claim 1, further comprising a position sensor configured to measure the rotor position.

9. The motor control circuit of claim 8, wherein the input to the neural network further includes a measurement of the rotor position by the position sensor of the current control cycle.

10. The motor control circuit of claim 9, wherein the neural network is trained to estimate the rotor position in terms of a difference to the measurement of the rotor position by the position sensor of the current control cycle.

11. The motor control circuit of claim 9, wherein the controller is configured to determine values of the plurality of control voltages for the current control cycle using the estimate of the rotor position and the measurement of the rotor position by the position sensor of the current control cycle.

12. The motor control circuit of claim 9, comprising a safety function circuit configured to receive the estimate of the rotor position and the measurement of the rotor position by the position sensor of the current control cycle and to execute safety measures depending on a difference between the estimate of the rotor position and the measurement of the rotor position by the position sensor of the current control cycle.

13. A method for controlling a motor, the method comprising:
   measuring a plurality of operation currents of the motor;
   estimating a rotor position of the motor for a current control cycle by a neural network having a multi-layer perceptron architecture, wherein the neural network is trained to estimate the rotor position of the motor for the current control cycle from an input including,
   for each control cycle of one or more previous control cycles,
   values of a plurality of control voltages supplied to the motor in the control cycle; and
   values of the plurality of operation currents measured by one or more current sensors in the control cycle; and for the current control cycle, values of the plurality of operation currents measured by the one or more current sensors in the current control cycle; and determining values of the plurality of control voltages for the current control cycle using the estimate of the rotor position.

14. The method of claim 13, comprising training the neural network by, for each of a plurality of training inputs, each training input comprising:

for each control cycle of one or more respective previous control cycles, values of the plurality of control voltages for the control cycle; and values of the plurality of operation currents for the control cycle; and for a respective current control cycle, values of the plurality of operation currents for the current control cycle;

generating ground truth data provided by a position sensor having higher accuracy than a position sensor of a motor control circuit; and training the neural network to estimate, for each training input, the rotor position of the motor by supervised training using the generated ground truth data.

15. A motor control circuit comprising:

a controller with a voltage output, a current input, and an estimated position input;

a micro-controller peripheral with a voltage input coupled to the voltage output of the controller over a voltage interface, and a current output coupled to the current input of the controller over a current interface; and a neural network with a voltage input coupled to the voltage interface, a current input coupled to the current interface, and an estimated position output, wherein the estimated position output of the neural network is coupled to the estimated position input of the controller.

16. The motor control circuit of claim 15, further comprising:

a position sensor with a measured position output, wherein the neural network has a measured position input coupled to the measured position output of the position sensor, and the controller has a measured position input coupled to the measured position output of the position sensor.

17. The motor control circuit of claim 16, wherein the position sensor has a position input that is coupled to a motor.

18. The motor control circuit of claim 16, further comprising:

a safety circuit with an estimated position input and a measured position input, wherein the estimated position input of the safety circuit is coupled to the estimated position output of the neural network, and the measured position input of the safety circuit is coupled to the measured position output of the position sensor.

19. The motor control circuit of claim 18, wherein the controller has a port coupled to an instruction interface, and the safety circuit has a port coupled to the instruction interface.

20. The motor control circuit of claim 15, wherein the microcontroller peripheral comprises one or more current sensors and has a current input that is coupled to a motor.

* * * * *